June 19, 1934.  B. E. BALDUF ET AL  1,963,609
BUILDING INSULATION
Filed Nov. 23, 1931
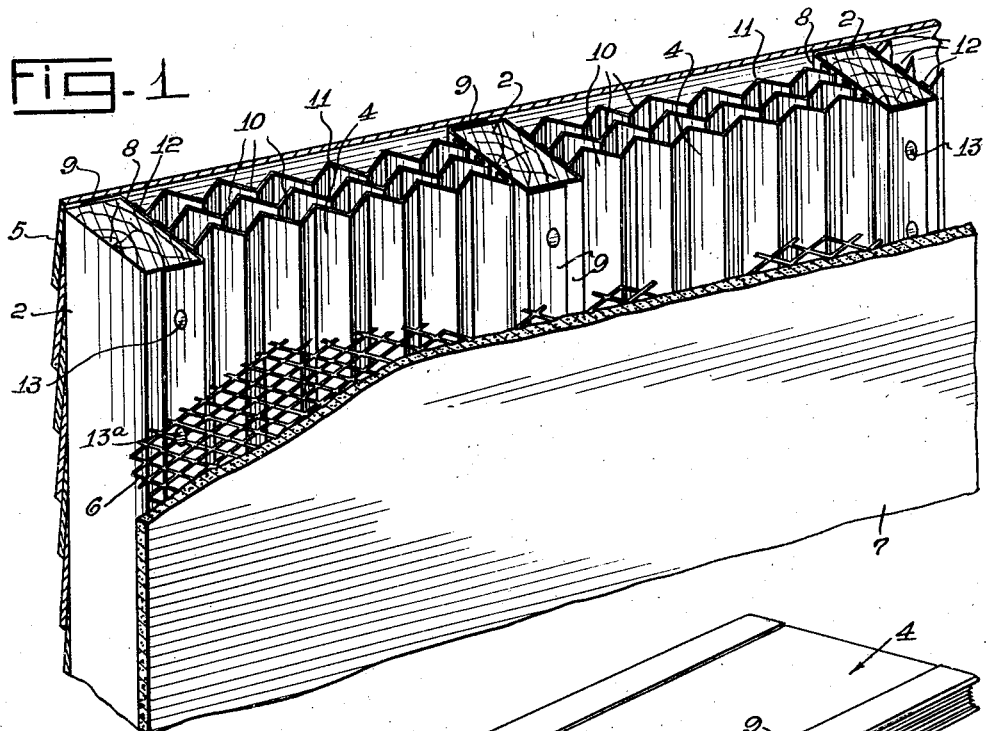
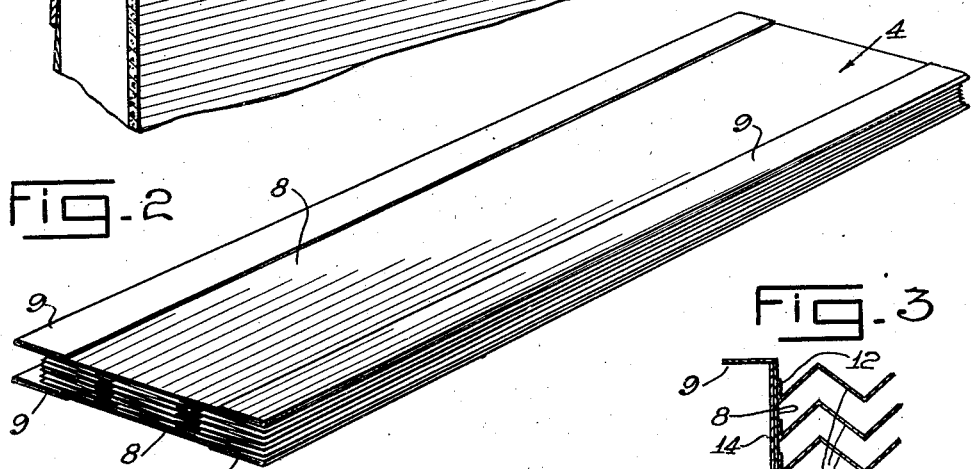
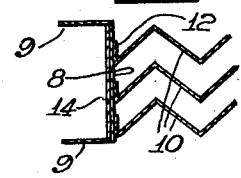
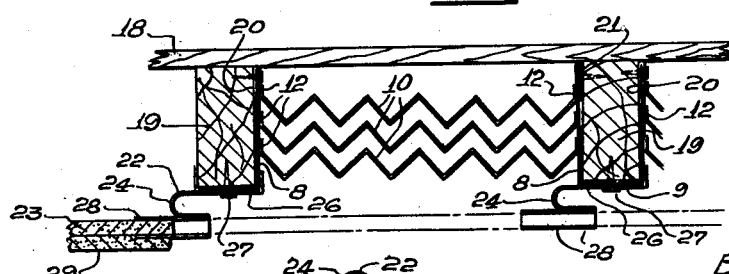
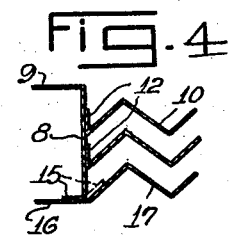
INVENTOR
BRUNO E. BALDUF.
HAROLD O. HAYES.
BY
ATTORNEY Patented June 19, 1934

1,963,609

UNITED STATES PATENT OFFICE 1,963,609

BUILDING INSULATION

Bruno E. Balduf, Chicago, and Harold O. Hayes, Evanston, Ill., assignors to United States Gypsum Company, Chicago, Ill., a corporation of Illinois Application November 23, 1931, Serial No. 576,640

22 Claims. (Cl. 20—4)

The present invention relates to building insulation and more particularly to a collapsible insulation unit adapted to be placed between the supports in a building or the like for purposes of thermal, sound, or moisture insulation.

Insulation of buildings against temperature variations and moisture as well as sound has absorbed the attention of many persons up to the present time. Many different types of insulation materials and insulation units have been proposed for the purpose with varying degrees of success. A particular and peculiar problem is presented, for example, by the needs of light frame construction such as dwelling houses, small factories, garages, refrigerator cars, and other similar structures where insulation of the type under consideration is highly advantageous but has heretofore generally been omitted because of the prohibitive cost. This cost has been incident either to the materials of which the insulation has been fabricated, the expense of fabrication, the expense of transportation because of the weight or cumbersomeness of the units, or the labor required in erection. Moreover, where the insulation materials or units have been sufficiently inexpensive they have most generally been found relatively ineffective. Different types of heavy paper slabs or sheathings have been proposed, one type comprising layers of corrugated sheets joined into a rigid unit, another type consisting of layers of sheets extending between the supports of the building, all combining the non-transmissive value of quiescent air with materials to which various degrees of insulation value are attributed. These prior art structures, however, have generally been found lacking in numerous respects essential to the success of an insulation for the purpose outlined. There has thus continuously been present a very real need and demand for an insulation unit embodying the attributes of economy and efficiency requisite to insulation for the purpose set forth.

It is therefore an object of the present invention to provide an insulation unit which is adaptable to insulate against temperature changes as well as against sound and moisture transmission.

Another object of the invention is to provide an insulation structure characterized by economy of material, simplicity of erection and efficiency in results.

A further object of the invention is in the provision of a light sheet material structure which provides a series of divided air spaces for reducing the transmission of sound and also for providing an effective insulation against transmission or loss of heat.

An additional object is to provide an effective insulation for application between the studs, joists or rafters of a building, and which is adaptable to variable spacings of said studs, joists or rafters A still further object of the invention resides in the provision of a collapsible, telescoping or folding type of fabric or other sheet material insulation which may be folded or collapsed to occupy a minimum space for storage and shipping but which is extensible for variable spacing of building studs or other members to which it is applied; also to improve insulated buildings and insulation units in other respects hereinafter specified and claimed.

Reference is to be had to the accompanying drawing forming a part of this specification, in which Figure 1 is a fragmental, perspective view of a wall embodying the features of the present invention;

Figure 2 is a perspective view of an insulation unit, embodying the features of the present invention, in collapsed position prior to erection in a building structure;

Figure 3 is a fragmental sectional view of the improved insulation unit showing a modified end support;

Figure 4 is a fragmental sectional view showing a further modification in the structure of the unit;

Figure 5 is a sectional plan view of a portion of a building structure illustrating, in combination with sound deadening treatment, a somewhat modified construction of the insulation unit and a modified application of the same in the building structure; and Figure 6 is a perspective view of a suggested type of resilient clip for use in a sound deadening installation such as suggested in Fig. 5.

In our application, Serial No. 375,183, filed July 1, 1929, now Patent No. 1,906,510, issued May 2, 1933, we illustrate and describe apparatus for making and folding building insulation of sheet material. Our present application is a continuation in part of our said prior application and relates particularly to a type of insulation unit which may be fabricated by the said apparatus and the adaptation of the same to building structures.

As illustrated in Fig. 1, there are attached to the building studs 2 a plurality of insulation units indicated generally by the numeral 4. Siding 5 or any other covering material may be applied to one side of the wall, and metal lath or other lathing means 6 to receive plaster 7 or the like, plasterboard, tiles or other wall covering materials, may be applied to the opposite side of the wall.

The insulation units 4 are preferably fabricated from a sheet material such as paper or felt fabric, paperboard, light weight corrugated board or any other suitable material, into strips of any desired lengths, the material preferably being waterproofed with, or having incorporated therewith, waterproofing substances such as any of the various bitumens, waxes or sizes ordinarily used for the purpose. Each unit preferably comprises end pieces 8, of a semi-rigid material, having flaps or flanges 9 and a plurality of dividing walls 10. These dividing walls 10 are preferably of a somewhat lighter sheet material than the end pieces 8 and comprise a plurality of fan folds or concertina folds 11, with attaching edges or flanges 12 secured in spaced relationship by adhesive, asphalt or any other suitable means to the end pieces 8.

By reference to Fig. 2 it is seen that the dividing walls 10 fold or collapse upon themselves so that the folds 11 extend inwardly and somewhat overlap themselves, and the flaps 9 fold back against the ends 8, thus forming a very compact unit. A considerable number of these units, may be bundled together for storage and shipping, occupying a minimum of space. It is evident that with this unit sufficient insulation for even a large installation will occupy a very limited space and the shipping expense will be very small due to the comparatively light weight of the material and the compactness of the units. These features, together with the fact that the materials from which the units are preferably made are of a very inexpensive sort, are very important factors in bringing this concertina type of insulation within the reach of those building low cost homes, such, for example, as ready-cut houses or other light structures.

The present type of insulation is preferably applied after the framework of the building is erected and before the siding, lath or the like is secured in place. The spacing of the supports between which the insulation units 4 are to be placed is of little moment since these units allow for variation within all the latitude permitted in building construction without affecting their adaptability, because of their inherent extensibility. The units are preferably, in quantity production, so constructed as to be adaptable to spacings from about the narrowest to around 24 inches. The insulation is generally prepared in strips of a length about equal to the standard height of the studs between sill and plate; but when different lengths are required the necessary portion of a strip is easily severed while still in collapsed position, as by means of a knife, hatchet, shears or the like.

When the strips are ready to be placed, the flaps 9 of one end are bent outwardly, the end piece is placed in abutment against the inner face of a stud 2 and the flaps 9 are fastened against the two outer faces of the stud by means of tacks or nails 13, or by mopping with adhesive or by any other suitable means. The insulating unit is then expanded to extend to the next stud so that the opposite end piece 8 will abut thereagainst, and the flanges 9 thereon are secured in place similarly to those first attached. The flaps 9 are preferably of somewhat more than half the width of that face of the stud against which they are attached whereby the flaps of adjoining units will overlap, in effect substantially completely encasing the studs throughout the wall and providing a continuous sheathing therefor. The same procedure is applicable to the placing of this insulation between the floor joists or roof rafters. Since in the latter cases the timbers are usually of somewhat different dimensions than ordinarily used for the studding, different dimensions may be desired in the insulation units, but this is very easily met by appropriate adjustments in fabrication. It is also to be noted that although the units 4 are illustrated as preferably comprising three dividing walls 10 having five or six folds, they may be provided with a lesser or greater number of walls and/or folds as desired for various purposes and requirements.

Where a pipe or conduit must pass horizontally through the wall of the building, the dividing walls 10 of the unit are easily punctured with a suitable instrument to receive such pipes; and due to the great flexibility of the insulation, vertical obstructions are no serious impediment to erection.

Since the insulation provides a continuous sheathing, building paper ordinarily used in the walls becomes unnecessary and if desired the customary wooden sheathing between the studs and siding may be eliminated because drafts and moisture as well as sound are effectively insulated against. The same holds true where the exterior is to be covered with stucco, where the wire mesh or lath may be secured directly to the insulation covered studs, and the stucco applied.

It is generally preferable to form the end pieces 8 of a semi-rigid and somewhat heavier material than the dividing walls 10, but where it is desired to fabricate the entire structure of the same comparatively light weight material, it becomes preferable to provide a stiffening member 14 on the stud abutment face of the end pieces 8 (Fig. 3) to incorporate the most generally desirable stiffness in the end pieces so that the unit may be properly and expeditiously expanded during erection.

For some purposes it will be found preferable to fabricate the unit along the lines illustrated in Fig. 4. Here the desired number of dividing walls 10 are attached by means of flanges 12 to the end pieces 8. The end pieces 8, however, instead of being provided with two free attaching flaps 9, is adhesively or in any other suitable manner attached by means of flange 15 to an extension 16 of the outermost dividing wall 17. Although the flange 15 is illustrated as being attached to the extension 16, it may as well, when desired, be turned the other way for attachment to the inside of the wall 17, as shown in dotted line position. A construction such as this finds particular adaptability where it is desired for any purpose to have all that part of the unit exposed on one side of a structure of an integral piece, or of a uniform material. It permits, for example, of making the end pieces 8 and the walls 10 of an asphalt saturated material while the wall 17 and extension 16 may be of untreated material of different or the same nature, perhaps coated with waterproofing only on the inside. In another instance it may be desirable to have the wall 17 and its extensions 16 of a thoroughly waterproof material to constitute the face of the unit which will be exposed to the side of the building structure subjected to dampness or a moist atmosphere, while the remainder of the unit may be made of a material of less moisture resistance.

Although from the very nature of the product the genus of insulation at present under consideration is particularly adapted for incorporation in structures in process of erection, the unit we have devised may be quickly placed as desired in structures already completed but where one side of the wall, roof, floor or ceiling is unenclosed. By reference to Fig. 5, where one side of the structure is represented, for purposes of illustration, as enclosed by boarding, flooring or the like 18, it will be seen that the unit may be very effectively inserted in such a construction. The great flexibility of the unit admirably adapts it for this purpose. In one method of placing a unit between the studs or beams 19, the flap 20 is allowed to remain folded back against the end piece 8, the end piece is placed against a timber 19 so that the edge, if necessary, abuts the boarding 18, and the doubled over portion is nailed in place while the body part of the unit is deflected to one side to permit access for nailing. The flange 9 of this end may then be secured to the outer face of the timber in the usual manner, if it has not previously been secured. The opposite end of the unit is then secured in place by first nailing the flap 21 in place against the timber 19 while pushing the end 8 back against the boarding 18, and thereafter bringing the nailing flap 9 around and securing the same to the outside of the timber. The unit is thus securely held in place to obtain the greatest efficiency under the circumstances.

The manner of attaching the end flanges 12 to the end pieces, it will be noted, is slightly different in the embodiment illustrated in Fig. 5, whereby these flanges extend away from the first adjacent fold instead of in the same general direction. This manner of attachment is desirable under certain circumstances, although in general we prefer a manner of attachment as shown in Fig. 3, for example.

It is apparent that ceiling or wall faces which are frequently left uncovered on the interior, such as in basements, attics, garages, partitions and the like, will present a much improved appearance after appropriate units of our improved type of insulation are in place even though no surfacing is put over those faces. This arrangement secures all the benefits of the units for their thermal, sound, draft and moisture insulation while the exposed walls of the insulation will provide a substantially uniform as well as pleasing ridge and trough surface arrangement. A unit fabricated as suggested in connection with Fig. 4 may be found particularly desirable for this purpose.

It will be seen from an inspection of Fig. 1, that the rather thick overlapped flaps 9 are interposed in the manner of a sub-base between the metal or wood lath, plaster board, fiber board or other plaster base 6 and the studs 2 so that the nails 13a overhang cantilever fashion beyond the studs 2 the thickness of these flaps. Owing to the natural resiliency of the nails 13a, they can bend slightly and permit warping or movement of the studs 2 independently of the plaster surface 7, and thus prevent cracks in said plaster surface or whatever more or less rigid cementitious surfacing that may be employed. Other types of yielding spacing strips may be interposed between the studs 2 and plaster base to secure the same results and insure a crackless wall.

A great advance in the art of sound control has been discovered by one of the applicants, in that where the face of a wall is resiliently separated from the supports, or the members supporting the face portion are resiliently separated from the more massive part of the wall, a very great percentage of the sound waves will be prevented from transmission through the wall. As has already been pointed out, our insulation unit is a very valuable sound insulation. Consequently, a more efficiently sound-proof wall or ceiling is obtained by combining our insulation with a resilient treatment of such wall or ceiling. One suggested manner of accomplishing this combination is shown in Fig. 5, where after the insulation units are positioned between the supports 19, resilient clips 22 are secured against the same supports to engage wallboards, fiberboards, acoustical tiles, or like slab material 23, or to support metal lath or other means for receiving cementitious material, in spaced relation to the supports 19. The clips, of which the type illustrated in Fig. 6 is but a representative example, preferably comprise a spring loop 24 provided with means 25 for engaging the wallboard or the like, and a base flange 26 for attachment to the supports 19 as by means of nails 27 or any other suitable means. In the illustrated form of clip, the means 25 comprises a plurality of oppositely extending lugs 28 forming oppositely extending channels for engaging the edges of the wallboard or similar panels. Instead of being adapted to engage panels, the means 25 may be modified to provide for the retension of metal lath or wire mesh thereon to provide a ground for receiving cementitious material such as ordinary plaster or acoustical plaster. Acoustical plaster usually comprises a coarse aggregate and other ingredients which produce a body of very porous nature having interconnecting interstices when set. Acoustical tiles may be made of similar material as acoustical plaster or of an aggregate of mineral wool or similar porous material suitably bound together into slabs of desired dimensions. A good quality acoustical plaster or acoustical tile has a high sound absorption efficiency; and it is therefore obvious that where a wall is treated with this sort of material a high degree of acoustic control will result.

When sound waves impinge upon the surface 23, the surface will naturally vibrate; but because of the resiliency of the spring loops 24 the vibrations will be dissipated and prevented from passing through the wall to set up sound waves on the other side of the wall. The air in the space between the supports 19 might, however, be set into motion by the vibrations of the surface 23 and transmit a certain degree of sound through the opposite surface 18, by setting up vibrations therein, and thus to the other side of the wall. But where our novel insulation unit is secured between the supports 19, dividing the area into a plurality of isolated air spaces, any vibrations will be effectively dissipated and prevented from passing through to the other side of the wall because of the combination with the air spaces of the relatively unconnected, untensioned membrane-like dividing walls 10, which are neither easily set into vibration themselves nor readily transmit any vibration one to the other. Where the surface 18 is a floor, an additional feature of sound absorption is obtainable by the application of resilient spring clips, embodying the resilient loop principle of the illustrated clip 22, between the supports 19 and the flooring to resiliently carry the floor. Not only does the construction of Fig. 5 provide effective sound and heat insulation, but also acoustical control, where the surface 23 is an acoustical material, or has an acoustical plaster or the like 29 applied thereto. Acoustical plaster or acoustical tile seems to be most efficient in absorbing sounds of high frequency waves and thus the spring suspension of an acoustical wall face also improves and balances the absorption efficiency of the acoustical material by absorbing sounds of low frequency.

It is thus apparent that our contribution to the insulation art provides a simple, inexpensive insulation taking advantage of the known insulative quality of dead air by dividing the area within the wall into a plurality of isolated air spaces by means of a new membraneous structure, the device preferably being made of material itself characterized by more or less insulative value. In fact, it has been found by tests that even where made of a relatively light weight material, a unit such as the specific embodiment illustrated and described provides heat insulation equivalent to at least one inch of cork. Moreover, this type of insulation greatly reduces sound transmission, excludes drafts and where adequately waterproofed makes the construction moisture-proof. Our novel insulation is also exceptionally adaptable to a great variety of conditions and structures.

We would state in conclusion that while the illustrated examples constitute practical embodiments of our invention, we do not wish to limit ourselves precisely to these details, since manifestly, the same may be considerably varied without departing from the spirit of the invention as defined in the appended claims.

Having thus described our invention, we claim as new and desire to secure by Letters Patent.

1. Building insulation comprising a plurality of collapsible sheets and flanged separate end supports to which they are fastened, adapted to be extended to fill the space between building studs for forming a multi-wall structure with a plurality of air spaces between the studs.

2. A fan-folding type of building insulation consisting of a plurality of fabric sheets and flanged separate fabric end pieces to which the ends of the sheets are attached, the sheets being foldable upon themselves between the end pieces and extensible to form a multi-wall structure with air spaces therebetween.

3. A concertina type of building insulation comprising flanged end pieces adapted to be attached to building studs and a plurality of folding sheets separately attached at the ends to the end pieces and collapsible upon themselves to occupy little space when folded and extensible to the full length of the sheets between the end pieces.

4. Building insulation comprising spaced studs and a unit insulation fitting between and covering the studs comprising end pieces to fit over three sides of a stud and to overlap the proximate insulation at the other side of the stud, and a plurality of fan-folding sheets connected at their ends to the end pieces, and collapsible upon themselves when folded, the sheets being extensible to provide a plurality of air spaces between the studs to which the end pieces are applied.

5. A building construction comprising spaced studs, end pieces each fitting over one side and the opposite exposed edges of a stud, the edges of adjacent end pieces overlapping at the exposed faces of the stud, and a plurality of fan-folding fabric sheets extending between adjacent studs and connected at their ends to the end pieces, the fabric sheets and the connected end pieces forming a unit collapsible structure adapted to be inserted between adjacent studs and extended to fill the space between them forming a plurality of disconnected parallel air spaces separated by the fabric walls.

6. Insulated building structure comprising spaced building studs and a unit type insulation comprising an extensible multi-wall sheet material structure with connected sheet material end pieces extending over one inner side and overlapping the opposite exposed edges of the stud and adapted to form a number of parallel wall spaces between the two studs to which the end pieces of the insulation are attached.

7. An insulation unit comprising separate end supports for attachment to each edge of the studs of a building and a body portion comprising a plurality of extensible folds between said end supports and connected to the same intermediate the edges thereof.

8. An insulation unit comprising sheets of flanged waterproof material adhesively secured together, to form end supports for attachment to the supports of a building and a body portion comprising a plurality of extensible folds separately attached between said end supports.

9. An insulation unit comprising a body portion having a plurality of extensible folds, separate end supports to which said body portion is attached, said body portion and end supports being made of the same material, and reinforcing strips on said end supports to maintain the same relatively rigid despite the tension exerted thereon when said unit is extended.

10. In an article of the class described, a pair of substantially parallel strips, and a plurality of separate fan folds between and connected directly with said strips, whereby said strips will lie closely adjacent one another when in folded shipping position before said article is placed in use.

11. In an article of the class described, a pair of substantially parallel strips, a plurality of separate fan folds between and connected directly with said strips, and attaching flaps along the edges of the strips, said strips lying adjacent one another and the flaps lying against the strips to facilitate transportation of said article.

12. In a building structure, a plurality of spaced supports, and insulation between and surrounding said supports, said insulation comprising a plurality of units dividing the space between said supports into a plurality of isolated air spaces and substantially completely encasing said supports.

13. In a framework structure, a plurality of spaced supports, and waterproofed insulative material between and substantially encasing said supports, said waterproofed material comprising a plurality of collapsible units providing a plurality of isolated air spaces in the area between the supports and forming a substantially continuous sheathing on either side of said structure, whereby insulation against temperature changes, sound and moisture is obtained.

14. In a framework structure, a pluraltiy of spaced supports, and unit insulation between said supports, each unit of insulation comprising a fan folded dividing wall structure for dividing the area between said supports into a plurality of isolated air spaces, and end pieces provided with attachment flaps for attachment to the supports, the attachment flaps of adjacent units overlapping whereby said framework structure is substantially completely encased.

15. In a framework structure, a plurality of spaced supports, unit insulation between said supports, each unit comprising a collapsible dividing wall structure for dividing the area between the supports into a plurality of isolated air spaces and end pieces provided at each edge with attachment flaps, said flaps along one edge of the end pieces being folded back against said end pieces and secured against the inner faces of said supports, and the remaining flaps being secured against the outer faces of the supports.

16. In a building structure, a plurality of spaced supports, insulation between and surrounding said supports, said insulation comprising a plurality of collapsible units dividing the space between said supports into a plurality of isolated air spaces and substantially encasing said supports, and covering means on both sides of said supports entirely enclosing said supports and insulation within the structure.

17. In a building structure, a plurality of spaced supports, insulation between and surrounding said supports, said insulation comprising a plurality of fan folding units dividing the space between said supports into a plurality of isolated air spaces and surrounding said supports on at least three sides, enclosing means on one side of said supports providing a substantially plane surface, and the remaining side being unenclosed, said insulation and the fan folds presenting a uniformly rigid surface.

18. In a building structure, a series of wooden studs subject to independent warping, a plaster base spaced apart from said studs, yielding strips of material between said plaster base and said studs, nails driven through said plaster base and strips of material and into said studs so that said nails overhang said studs to permit slight shifting of said studs relative to said plaster base, and a cementitious coating on said plaster base rendered crackless by the resiliency of said overhanging nails.

19. The combination in a building structure, or a series of studs subject to slight independent movement, flexible unit insulation extending between said studs, attachment flaps on said insulation attached in overlapping relationship to the outer faces of said studs, a plaster base spaced from said studs a distance equivalent to the thickness of the overlapped flaps, relatively resilient securing means driven through said insulation and securing said plaster base to the studs, said securing means overhanging said studs a distance substantially equal to the thickness of said flaps, and a rigid cementitious coating on said plaster base rendered crackless by the resiliency of said overhanging securing means.

20. In a building structure, a series of studs subject to slight independent movement, unit insulation between the studs and having overlapping flaps for attachment to the outer faces of said studs, a plaster base separated from said studs by said overlapping flaps, means for securing said plaster base to said studs, said means being capable of cantilever movement by reason of the spacing provided by the overlapping flaps, and a rigid cementitious coating supported by said plaster base and rendered free from cracking, when there is slight movement of said studs, by the cantilever movement of said securing means.

21. In a thermal, moisture, weather and sound insulated and crack-resistant wall structure, the combination of a series of supports subject to slight independent warpage or movement, waterproofed expansible unit insulation extending between said supports and dividing the area therebetween into a plurality of air spaces, said insulation comprising a fan folded collapsible body portion and means for attachment to said supports comprising overlapping flaps secured to the outer faces of the supports, a plaster base adjacent said supports, substantially resilient means for securing said plaster base to said supports, said securing means overhanging the supports cantilever fashion a distance equal to the thickness of said overlapping flaps, and a rigid cementitious coating on said plaster base rendered crackless by the resiliency of said overhanging securing means.

22. In a building structure, a series of studs subject to slight independent movement, resilient means overlying the outer faces of said studs, a plaster base spaced apart from said studs by said resilient means, means for securing said plaster base against said studs and overhanging said studs cantilever fashion a distance equal to the thickness of said resilient means, and a rigid cementitious coating on said plaster base rendered substantially free from cracking, due to warpage stresses set up by movement of said studs, by the cantilever action of the means for securing said plaster base against the studs.

BRUNO E. BALDUF.
HAROLD O. HAYES.